US005448813A

United States Patent [19]

Yassa

[11] Patent Number: 5,448,813

[45] Date of Patent: Sep. 12, 1995

[54] RETAINER-PIN TOOL

[76] Inventor: Essam K. Yassa, 859 N. Mountain Ave., Upland, Calif. 91786

[21] Appl. No.: 163,940

[22] Filed: Dec. 8, 1993

Related U.S. Application Data

[63] Continuation-in-part of Ser. No. 981,858, Nov. 23, 1992, abandoned.

[51] Int. Cl.[6] .......... B23D 15/18

[52] U.S. Cl. .......... 29/233; 29/278; 29/227; 81/124.2

[58] Field of Search .......... 29/270, 278, 280, 227, 29/233; 294/86.32; 81/124.2; 279/43.2

[56] References Cited

U.S. PATENT DOCUMENTS

| | | | |
|---|---|---|---|
| 342,824 | 6/1886 | Clark | 81/124.2 |
| 1,717,241 | 6/1929 | Moritsky | 81/124.2 |
| 2,422,549 | 6/1947 | Hogin | 29/278 |
| 3,190,250 | 6/1965 | Hinden | 29/280 |
| 5,012,624 | 5/1991 | Dahlgren | 81/124.2 |

*Primary Examiner*—Robert C. Watson
*Attorney, Agent, or Firm*—Frederick Gotha

[57] ABSTRACT

This invention relates to a retainer-pin tool for removably mounting the brake shoe of an automotive brake to the brake backing plate where the retainer-pin tool has radially and oppositely spaced internal keyway slots which are preferably orthogonal to each other and which extend at least in part in an axial direction and have openings in the transverse plane which defines the engagement end of the tool. The keyway slots have parallel sidewalls extending at least in part axially and are bounded radially by the axially extending outer peripheral surface of the tool. The sidewalls have a transition taper at the engagement end of the tool such that the transverse width of the keyway slots is greatest in the engagement surface. The engagement end of the tool has a truncated surface chamfer region which is pf sufficient smoothness to permit slideable bearing engagement between the tool and the retainer nut.

6 Claims, 6 Drawing Sheets

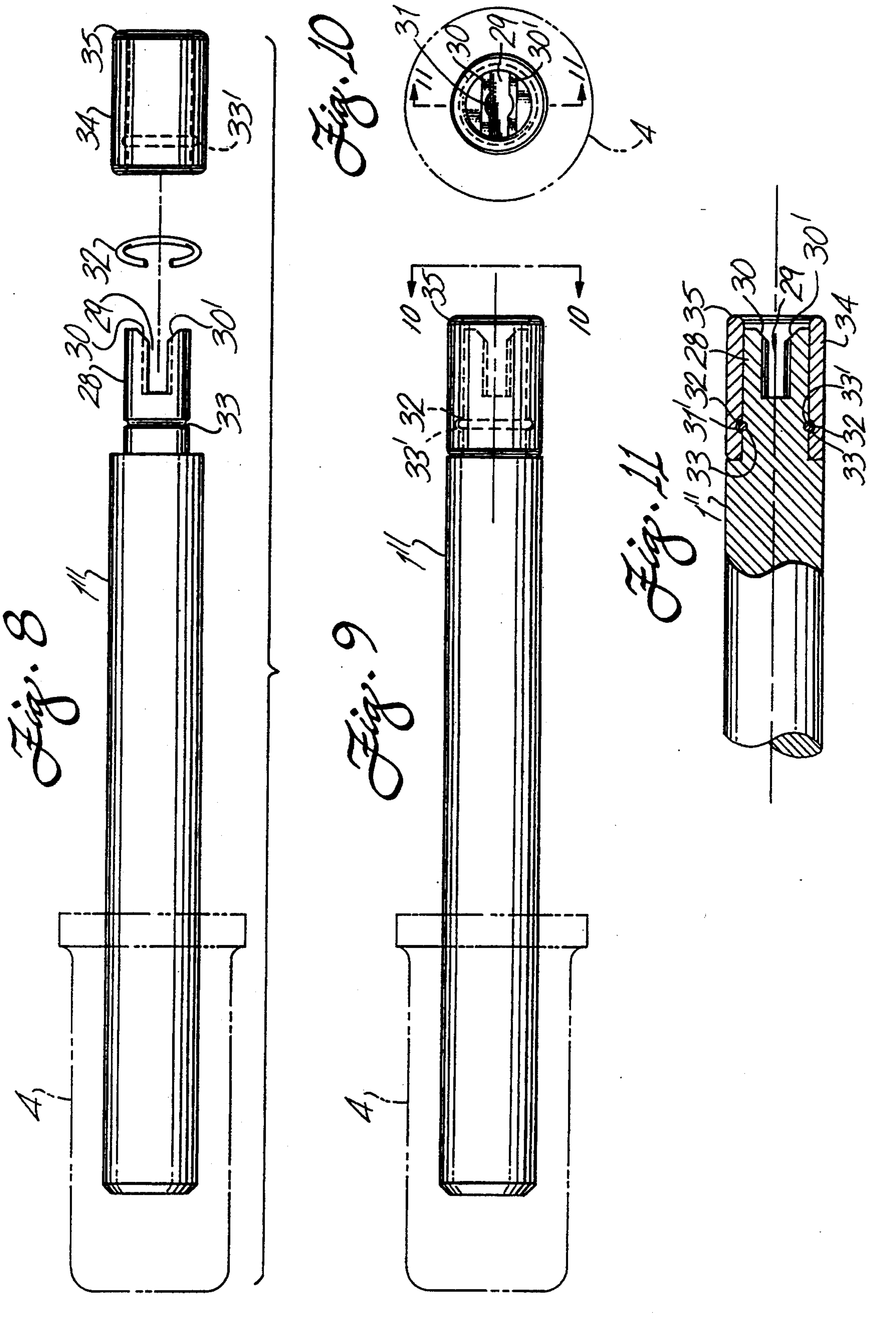

1
11
14
16
18
20
21

RETAINER-PIN TOOL

This is a continuation-in-part of U.S. application Ser. No. 07/981,858 filed Nov. 23, 1992 now abandoned,

FIELD OF THE INVENTION

This invention relates to a tool for use in mounting the brake shoe of an automotive brake to the brake backing plate.

BACKGROUND OF THE INVENTION

Automotive drum-type brakes generally incorporate a brake shoe which is pivotally mounted to the backing plate by an assembly which is commonly referred to as the hold-down assembly. There are several designs for the hold-down assembly which are presently in use. One design of this type assembly consists of a pin, a helical compression spring and a retainer nut which is in the shape of a round cup. Other designs incorporate the same type pin which is used with the retainer nut however, the retainer in such other designs generally incorporates a U-shaped flat spring type retainer. In the prior art, the pins utilized to hold the brake shoe to the backing plate are referred to as tension pins and these pins and the various types of automotive brakes incorporating a brake shoe will differ in length only. In all cases, where the tension pin is used to hold the brake shoe pivotally to the backing plate, the tension pin is mounted to the backing plate by passing the pin through an opening in the backing plate and subsequently through an opening in the brake shoe after which a spring type retainer is utilized and the tension pin placed in tension by rotation of the retainer thereby locking the assembly together.

In the prior art various types of tools are utilized to perform the locking function when a retainer nut is used in conjunction with the tension pin. There is no tool presently available which can be used to lock the U-shaped flat spring retainer to the tension pin.

In the prior art, as the tension pin is pushed through the backing plate and subsequently through the brake shoe and the helical compression spring, the tools of the prior art required that the retainer nut be pushed against the helical compression spring and over the locking flanges of the tension pin. The retainer nut was thereafter rotated approximately 90 degrees and the bearing compression of the spring against the retainer relieved. The relief of the spring compression secured the mounting flanges of the pin against the retainer nut thereby holding the brake shoe to the backing plate to permit relative pivot rotation of the brake shoe with respect to the backing plate. To disassemble the brake shoe from the backing plate, the retainer cup was pushed by the prior art tool against the helical compression spring which relieved the compression of the tension pin flanges against the retainer nut. The retainer nut was thereafter rotated until the tension pin flanges were aligned with a slot in the retainer nut through which the tension pin flanges could pass as compression on the helical spring was relieved.

The prior art tools used to accomplish the engagement and disengagement of the retainer nut gripped and turned the retainer nut as the nut was in bearing compression against the helical spring. In some instances, a pair of pliers with jaws especially shaped to be able to grip the retainer nut were utilized. In many instances however, while using the prior art tools, it was difficult to disengage the retainer nut from the pin and the use of such tools prevented the user from utilizing other tools in an attempt to loosen the nut from the pin. Where the U-shaped flat spring retainer-type nut was employed, there were no especially designed tools which could be used to lock the tension pin and U-shaped retainer together; this was achieved through the resourcefulness of the mechanic who was required to adapt existing tools to accomplish that purpose. In addition to the limitations in the use of the prior art tools, the production costs of manufacturing the prior art tools were excessive because the tool incorporated separate parts which required separate manufacture and thereby added to the higher cost of production.

SUMMARY OF THE INVENTION

There is, therefore, provided according to the present invention, a universal-type pin retainer tool for use in mounting automotive brake shoes to the brake backing plate.

The present invention is directed to a tool for removably mounting the brake shoe of an automotive brake to the brake backing plate where the retainer-pin tool has radially and oppositely spaced internal keyway slots which extend at least in part in an axial direction and have openings in the transverse plane which defines the engagement end of the tool. The keyway slots have parallel sidewalls extending at least in part axially and are bounded radially by the axial extending outer peripheral surface of the tool. The sidewalls have a transition taper at the engagement end of the tools such that the transverse width of the keyway slots is greatest in the engagement surface. The engagement end of the tool has a truncated surface region for chamfered transition from the outer periphery surface of the tool to its engagement face, where the truncated surface region is of sufficient smoothness to permit slideable bearing engagement between the chamfered portion of the tool and the retainer.

Several objects of the present invention:

(a) to provide the user with a universal tool that works on most types and sizes of the "hold-on assembly" whether it is a U-shaped flat spring retainer or a round retainer cup, i.e. a retainer nut;

(b) to provide the user with a tool which can be easily used with other tools in the event the tension pin is locked to the retainer;

(c) to provide the user with a tool which permits the user to rotate the tension pin relative to the retainer while holding the retainer nut or retainer U-shaped flat spring in compression;

(d) to provide the user with a tool which permits ready access to the hold-down assembly when it is partially obstructed by the axle flange;

(e) to provide a tool which is of one piece design and therefore less expensive to produce.

BRIEF DESCRIPTION OF THE DRAWINGS

These and other features and advantages will become appreciated as the same become better understood with reference to the following specification, claims and drawings wherein:

FIG. 8 is an exploded side elevational view of the retainer-pin tool of this invention in yet another embodiment.

FIG. 9 is a side elevational view of the tool of this invention shown fully assembled.

FIG. 10 is an end view of the retainer-pin tool of this invention taken along the line 10—10 of FIG. 9.

FIG. 11 is a part cross-sectional view taken along the line 11—11 of FIG. 10.

DETAILED DESCRIPTION

Figure 1:
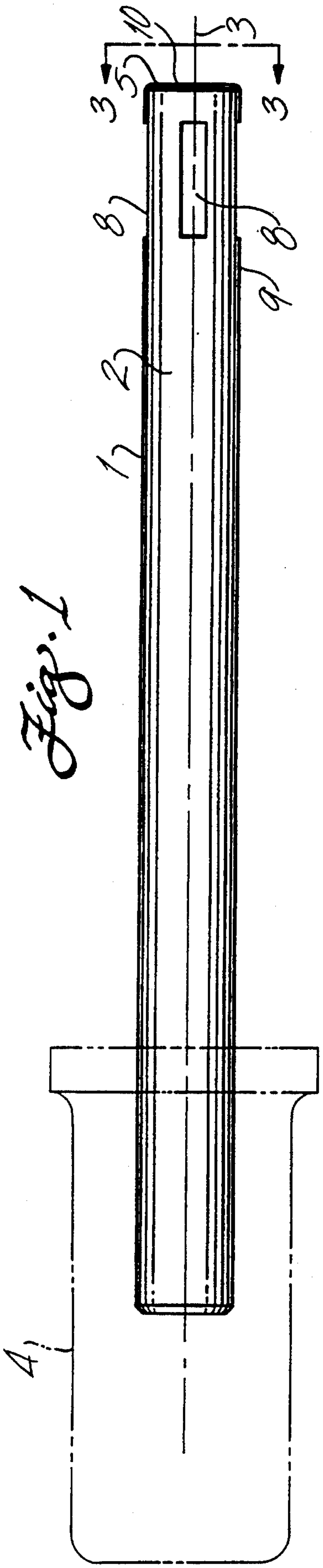
FIG. 1 is a right side elevation view of the retainer-pin tool of this invention illustrating the elongated body and the engagement end of the instrument.
Figure 2:
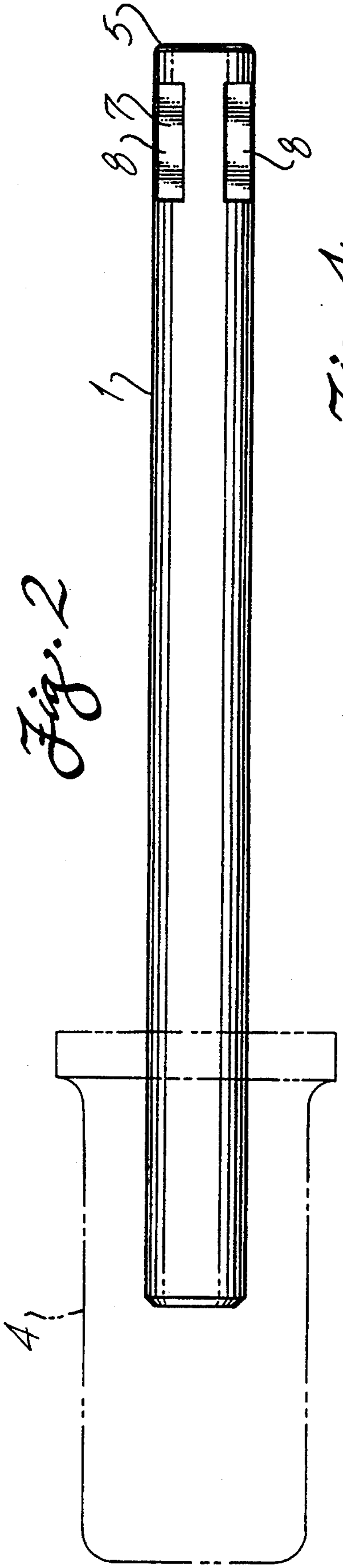
FIG. 2 illustrates the retainer-pin tool illustrated in FIG. 1 after the tool has been rotated about its longitudinal axis 45 degrees.

Turning now to FIG. 1, the retainer-pin tool 1 is shown having an extension member 2 which has a longitudinal axis 3 and a gripping end 4. The opposite end of the retainer-tool 1 has an engagement face 5. As can more clearly be seen in FIG. 3, engagement face 5 has a plurality of keyway slots 6 which have sidewalls 7 and 7'. The sidewalls have openings 8 in the peripheral surface 9 of the elongated member constituting the shank portion of the retainer pin 1. The shank portion is preferably made of a metallic material approximately 2½ inches in length with a chamfered region 10 defining a transition between the shank and the engagement face of the retainer pin tool 1. The chamfer region 10 is hardened, smooth and polished to permit the tool to rotate when the chamfered surface is in bearing engagement with a retainer nut 11 which is more clearly shown on FIG. 14.

Figure 4:
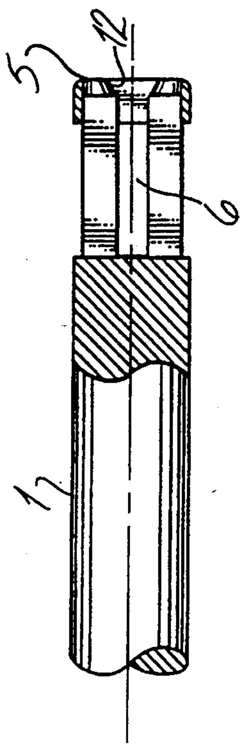
FIG. 4 is a part cross-sectional view taken along the line 4—4 of FIG. 3.
Figure 3:
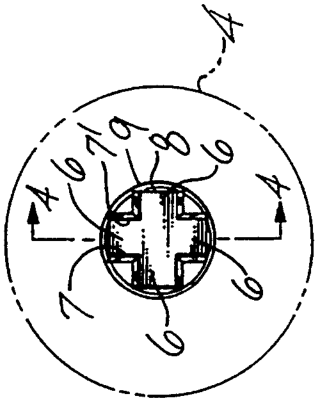
FIG. 3 is an end view of FIG. 1 taken in the direction of the line 3—3.

By referring to FIGS. 3 and 4 it can be seen that the engagement surface 5 has a chamfered transition surface 12 which tapers from engagement face 5 to keyway slot 6. The chamfered transition surface 12 defines a guiding window for more easily guiding the flanged tip portion of the tension pin 13 into the keyway slot 6; the tension pin is more clearly shown in FIGS. 12 and 13 and will be more definitively described hereafter.

Figures 12, 13:
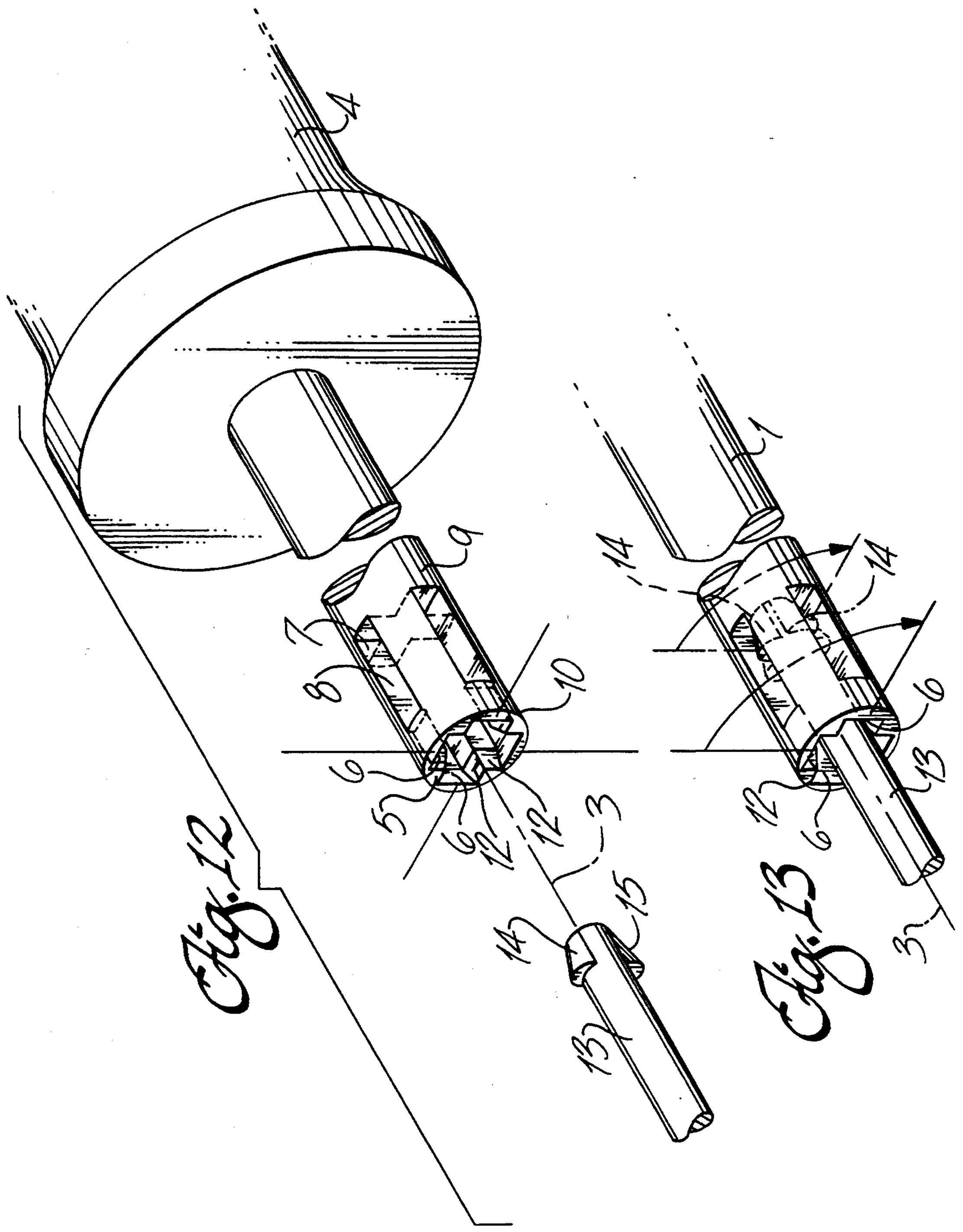
FIG. 12 is an exploded perspective view of the engagement end of the retainer-pin tool of this invention and the tension pin.
FIG. 13 is a perspective view illustrating the engagement end of the retain-pin tool of this invention after engagement with the tension pin and rotated 90 degrees.

Referring now to FIGS. 12 and 13, the tension pin 13 is illustrated in FIG. 12 having opposing conically tapered flanges 14 and 15 for insertion through engagement face 5 and into the keyway slots 6. After insertion of the tension pin 13 into keyway slots 6, the tension pin is rotated 90 degrees by turning the gripping end 4 of the retainer-pin tool 1. FIG. 13 illustrates the conical tapered flanges 14 and 15 of tension pin after the tension pin has been rotated 90 degrees by the retainer-pin tool. As can be seen in FIG. 13, the conical tapered flange 14 is shown in phantom after being rotated through 90 degrees by the tool. Referring again to FIG. 12, the keyway slots 6 are shown with the chamfered transition surface 12 which acts as a window guide to facilitate the alignment of conical tapered flanges 14 and 15 into the slots 6.

Figure 14:
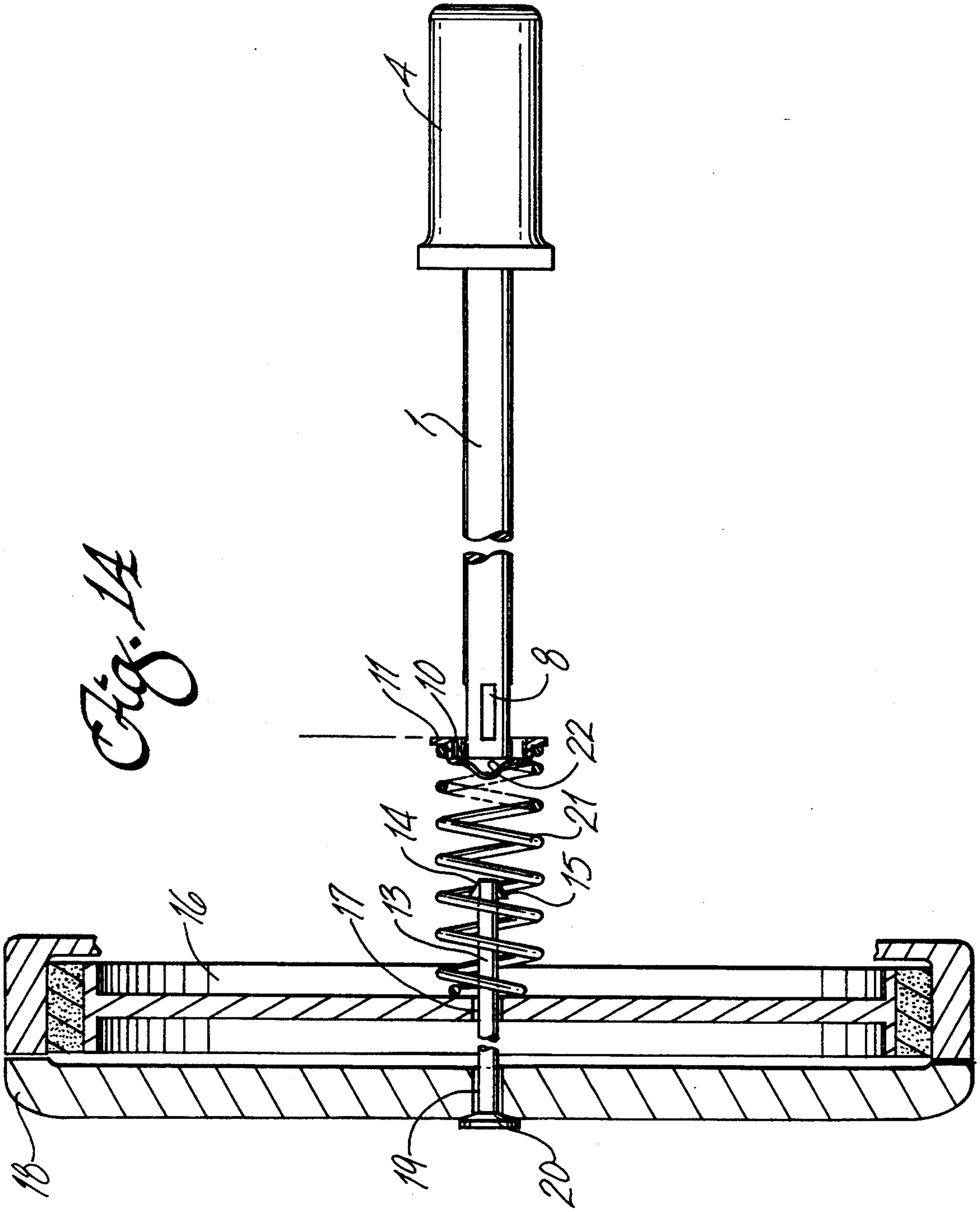
FIG. 14 is a part cross-sectional view of the hold-down assembly before compression of the helical spring by the retainer-pin tool of this invention.
Figures 15, 16:
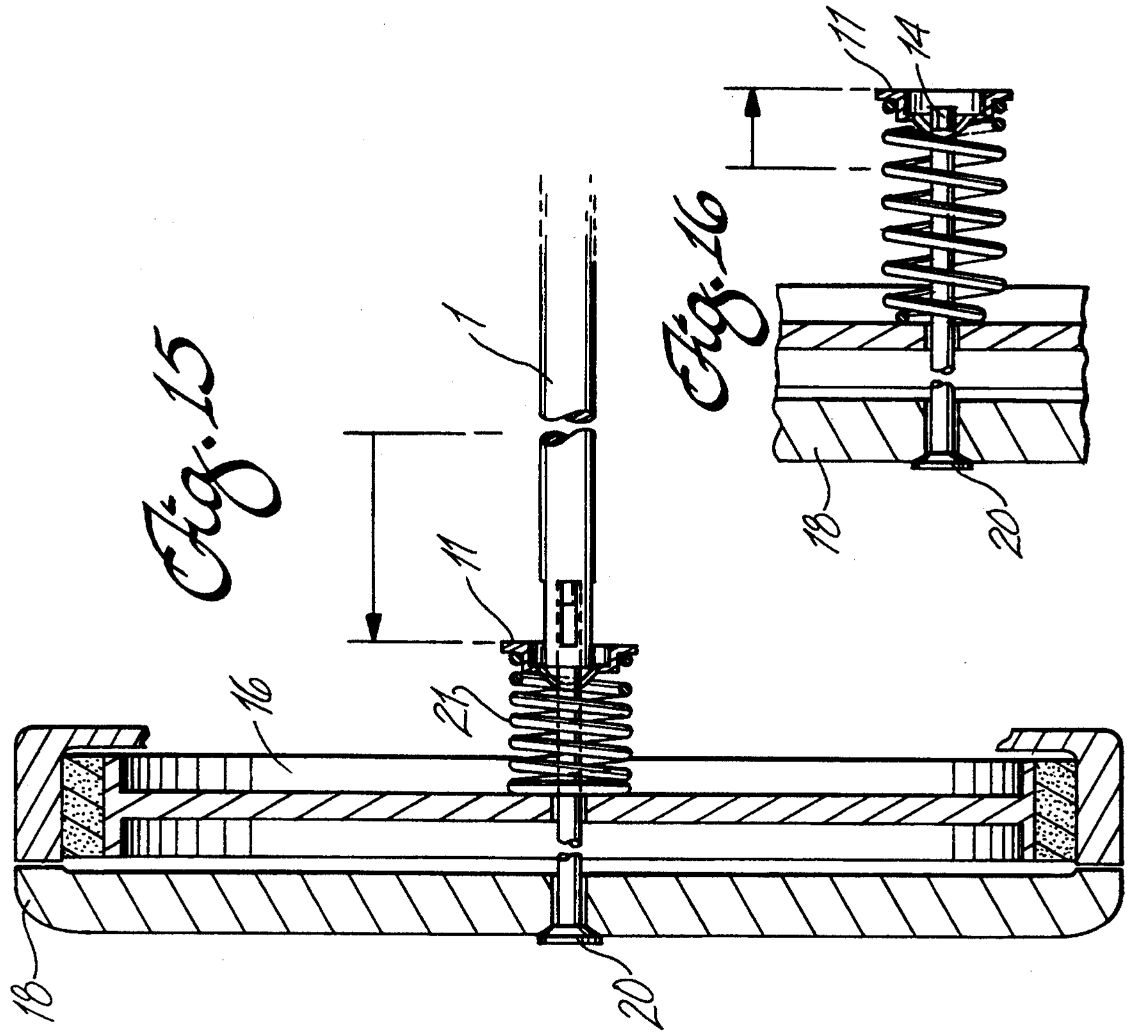
FIG. 15 is a part cross-sectional view of the hold-down assembly of this invention after the helical spring has been compressed.
FIG. 16 is a part cross-sectional view of the hold-down assembly after the retainer-pin tool has been released and the tension pin and retainer nut engaged.

FIGS. 14, 15 and 16 illustrate the use of the retainer-pin tool in mounting the brake shoe to the backing plate of the brake drum type automotive brake. As can be seen in FIG. 14, the brake shoe 16 has an opening 17 and is mounted to the backing plate 18 by the tension pin 13 passing through the opening 19 and the opening 17 in the brake shoe 16. The tension pin is inserted through opening 19 by the user and the tapered flanges 14 and 15 may be positioned by the user by rotating the head 20 of the tension pin 13. Although not shown in the drawings, the retainer nut 11 has a radially extending slot of sufficient width to permit the conical tapered flanges 14 and 15 to pass through when the flanges are aligned with the slot. Thus, in operation, the user will insert the retainer-pin tool into the retainer cup as shown in FIG. 14 and align the flanges 14 and 15 with the slot contained in the retainer nut 11. The helical spring 21 is then compressed by the user of the tool as shown in FIG. 15 and slight alignments necessary to be made in order for flanges 14 and 15 to pass through the retainer nut slot can be made by the user by turning head 20 of the tension pin 13. As can further be seen in FIG. 14, the chamfer 10 of the retainer-pin tool is in bearing engagement with the arcuate surface 22 of retainer nut 11. Chamfered surface 10 is a region of hardness and a smooth surface such that upon bearing engagement with inner surface 22, the retainer-pin tool will rotate relative to the retainer nut.

In FIG. 15, the compression of helical spring 21 by the retainer-pin tool is shown; compression of the spring occurs after the slot in the arcuate surface 22 of the retainer nut is aligned with the conical tapered flanges of tension pin 13. After helical spring 21 is compressed and the tapered flanges of the retainer-pin tool pass through the slot contained in the retainer nut, the retainer-pin tool is then rotated 90 degrees which in turn rotates the tension pin while the retainer nut 11 remains in fixed relationship with the spring. The retainer pin tool is thereafter withdrawn and the flanges 14 and 15 remain in bearing engagement with surface 22 thereby locking the retainer nut 11 to tension pin 13 which in turn mounts the brake shoe 16 to the backing plate 18 and the assembly is completed. To remove the retainer nut 11 from the tension pin the procedure above-described is merely reversed. The tool 1 is used to compress the spring and the tension pin 13 rotated until its flanges are in alignment with the slot in arcuate surface 22 of the retainer nut.

Figure 5:
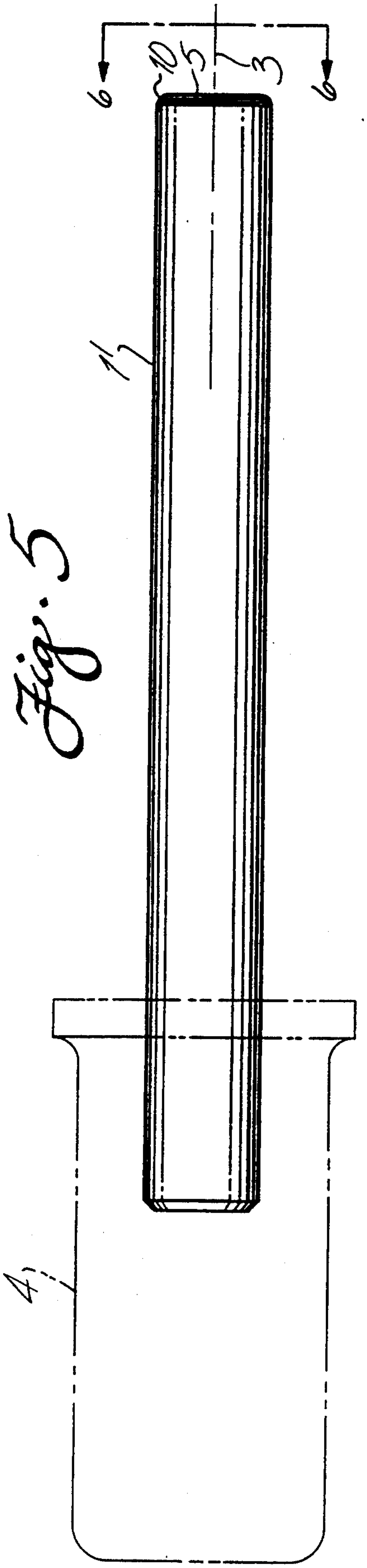
FIG. 5 is side elevational view of the retainer-pin tool of this invention illustrating another embodiment of the tool.
Figure 7:
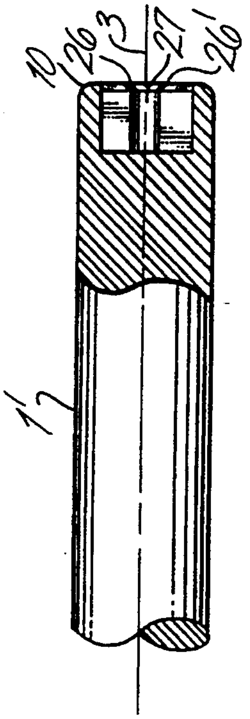
FIG. 7 is a part cross-sectional view taken along the line 7—7 of FIG. 6.
Figure 6:
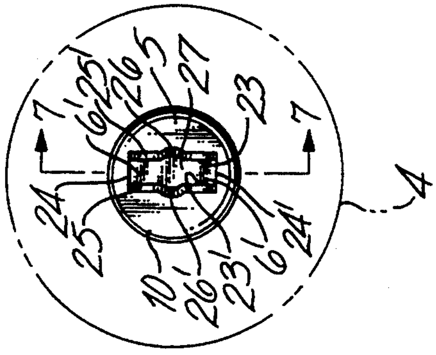
FIG. 6 is an end view taken along the line 6—6 of FIG. 5.

Referring now to FIGS. 5, 6 and 7, another embodiment of this invention is illustrated. As in the embodiment above-described, FIG. 5 illustrates a retainer-pin tool 1' having a chamfered transition surface 10 which is a smooth and hardened surface at the engagement end 5 of the tool. As can be seen in FIG. 6, the retainer-pin tool 1' has a pair of opposing keyway slots 6' having sidewalls 23 and 23' which are bounded by top walls 24 and 24' thereby defining the keyway slot 6'. Oppositely spaced transition surfaces 25 and 25' taper from the engagement face 5 into the keyway slots 6'. At the center of engagement face 5, the width of the keyway slots 6' is greater than between sidewalls 25 and 25' forming an arcuate surface to facilitate the alignment of the flanges of the tension pin with the keyway slots 6'. Thus, in operation, an opening 27 in the engagement face 5 of the retainer-pin tool 1' receives the conical tapered flanges 14 and 15 of the tension pin 13. The tension pin is then rotated with respect to the retainer nut 11 90 degrees so as to lock the flanges of the tension pin with the inner surface 22 of the retainer nut.

Another embodiment of this invention is illustrated in FIGS. 8, 9, 10 and 11. As can be seen in FIG. 8, the retainer-pin tool 1'' has at its engagement end a reduced diameter engagement surface 28 with a slot 29 cut completely through the reduced diameter engagement end of the tool. The inner slot 29 has horizontal chamfered surfaces 30 and 30' which taper from the engagement end of the tool toward slot 29. A bore 31 having a diameter slightly larger than the width of the opposing chamfers 30 and 30' extends axially through the slot 29. The purpose of the bore 31 in conjunction with the chamfered surfaces 30 and 30' is to permit the tapered flanges 14 and 15 of the tension pin to be more readily guided into the slot 29. A split ring clip 32 fits into the groove 33 to hold the sleeve 34. The corresponding arcuate groove 33' contained in the inner surface of sleeve 34 permits the locking of sleeve 34 to the reduced engagement portion 28 of the tool. The locking of the sleeve 34 to the tool 1'' is illustrated in FIG. 9. The sleeve 34 has a chamfered transition surface 35 which is smooth and polished to permit relative rotation of the tool with respect to the retainer nut after the helical spring has been compressed. FIG. 10 is an end view of FIG. 9 and the slot 29 can be seen with the chamfered transition surfaces 30 and 30' along with the bore 31 which permits the ready alignment of the flanges 14 and 15 of the tension pin into the slot 29. FIG. 11 illustrates the assembly in partial cross-section of the engagement end of the retainer-pin tool 1''. In operation, the above-described embodiment engages the tapered conical flanges 14 and 15 of the tension pin after the helical spring, as shown in FIGS. 14, 15 and 16, is compressed and the head of the tension pin 20 rotated to align the flanges 14 and 15 of the tension pin with the slot contained in arcuate surface 22 of the retainer nut 11. As in the previous embodiments the chamfered surface 35 permits the tool to rotate relative to the retainer nut 11 when the retainer nut is compressed against the helical spring 21. The sidewalls of the slot 29 engage the flanges of the tension pin and upon rotation of the tool 1'',the tension pin is rotated 90 degrees thus locking the tension pin and retainer nut together.

While I have shown and described certain embodiments of the present retainer-pin tool, it is to be understood that it is subject to many modifications without departing from the scope and spirit of the claims as recited herein.

What is claimed is:

1. An improved tool for removably mounting a retainer nut to a tension pin to hold the brake shoe of an automotive brake to the brake backing plate where said tension pin has a pair of oppositely mounted conical tapered flanges and said retainer nut has a slot of sufficient width to permit said flanges to pass therethrough upon alignment of said flanges with said retainer slot wherein the improvement comprises an elongated member having a longitudinal axis and an engagement end and a gripping end, said elongated member having a cavity therein extending at least in part axially and having an opening in the transverse plane defining the engagement end of said member said opening communicating with said cavity, where said opening is of sufficient transverse width to receive said flanges and said cavity is bounded transversely by a multiplicity of opposing sidewalls, said sidewalls having taper means at said engagement end such that said transverse width is greatest in said transverse plane for guiding said conical tapered flanges into said cavity upon rotational engagement of said flanges with said taper, and where said elongated member has a truncated surface region at said engagement end of sufficient smoothness to permit slideable bearing engagement between said truncated surface region and said retainer nut.

2. The improved tool recited in claim 1 wherein said cavity is bounded by parallel sidewalls extending at least in part radially from said axis and bounded at least in part by the peripheral outer surface of said elongated member.

3. The tool recited in claim 2 wherein said sidewalls define a pair of intersecting internal keyway slots.

4. The tool recited in claim 3 wherein said keyway slots intersect orthogonally.

5. An improved tool for removably mounting a retainer nut to a tension pin in the assembly of the brake shoe of an automotive brake to the brake backing plate, comprising an elongated member having a longitudinal axis and an engagement end and a gripping end, said elongated member having a cavity therein extending at least in part axially and having an opening in the transverse plane defining the engagement end of said member and communicating with said cavity, where said opening is so dimensioned and proportioned to permit the insertion of said tension pin therein, and where said cavity is bounded transversely by a multiplicity of opposing sidewalls defining a pair of intersecting slots, said sidewalls having a taper means at said engagement end such that said transverse width is greatest in said transverse plane for guiding said tension pin into said cavity upon rotational engagement of said pin with said taper means, said elongated member having a truncated surface region at the intersection of said engagement end and the outer peripheral surface of said elongated member where said truncated surface has sufficient smoothness to permit slideable bearing engagement between said elongated member and said retainer nut.

6. The tool recited in claim 5 wherein said slots are orthogonal.

* * * * *